United States Patent
Matsuzawa

(10) Patent No.: US 12,423,038 B2
(45) Date of Patent: Sep. 23, 2025

(54) PRINT CONTROL APPARATUS, METHOD FOR PRODUCING PRINTED OBJECT, AND PRINT CONTROL PROGRAM

(71) Applicant: SEIKO EPSON CORPORATION, Tokyo (JP)

(72) Inventor: Tomoki Matsuzawa, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 18/413,099

(22) Filed: Jan. 16, 2024

(65) Prior Publication Data
US 2024/0241679 A1    Jul. 18, 2024

(30) Foreign Application Priority Data
Jan. 17, 2023  (JP) .................. 2023-005106

(51) Int. Cl.
    *G06F 3/12*    (2006.01)
(52) U.S. Cl.
    CPC ............ *G06F 3/126* (2013.01); *G06F 3/1207* (2013.01); *G06F 3/1236* (2013.01)

(58) Field of Classification Search
    USPC ........................................ 358/1.15
    See application file for complete search history.

(56) References Cited

U.S. PATENT DOCUMENTS

| | | | |
|---|---|---|---|
| 11,347,449 B1 * | 5/2022 | Badana ................ | G06F 3/1222 |
| 2003/0011805 A1 * | 1/2003 | Yacoub ................ | G06F 3/1288 |
| | | | 358/1.15 |
| 2011/0043854 A1 * | 2/2011 | Sakikawa ............ | G06F 3/1259 |
| | | | 358/1.15 |
| 2022/0291885 A1 * | 9/2022 | Shibata ................ | G06F 3/1285 |

FOREIGN PATENT DOCUMENTS

JP    2015-005177 A    1/2015

* cited by examiner

*Primary Examiner* — Darryl V Dottin
(74) *Attorney, Agent, or Firm* — Global IP Counselors, LLP

(57) ABSTRACT

In a case where a near printer located in the same area as a print control apparatus and a distant printer located in an area different from the print control apparatus co-exist as selectable printers, when a user selects the distant printer to print, the user is warned before the print control unit is caused to print, and when the user selects the near printer to print, the print control unit is caused to print without warning the user.

7 Claims, 6 Drawing Sheets

FIG. 2
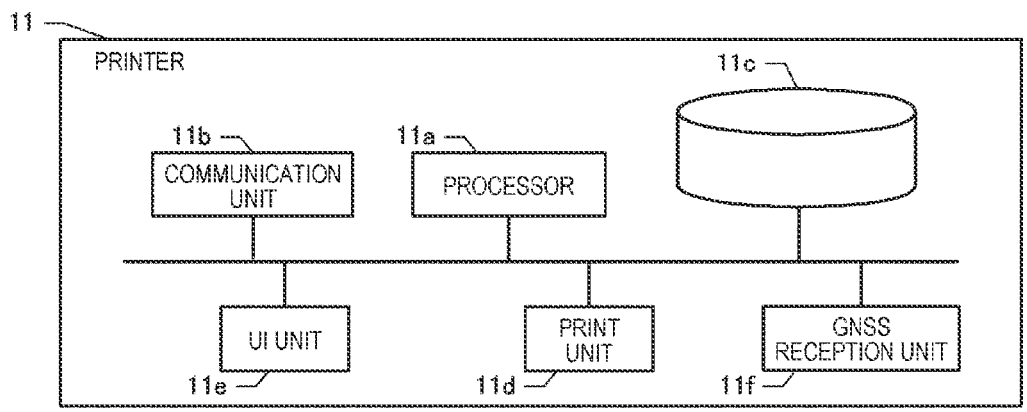
FIG. 3
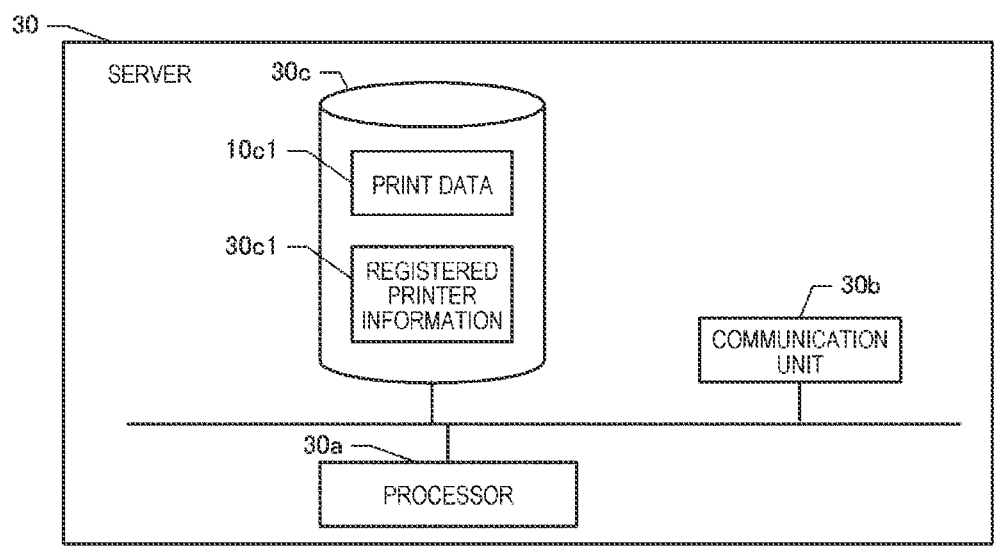
FIG. 4
| PRINTER ID | POSITION INFORMATION |
|---|---|
| PRINTER 001 | (X1, Y1) |
| | xxx . xxx . xxx . xxx |
| PRINTER 002 | (X2, Y2) |
| | yyy . yyy . yyy . yyy |

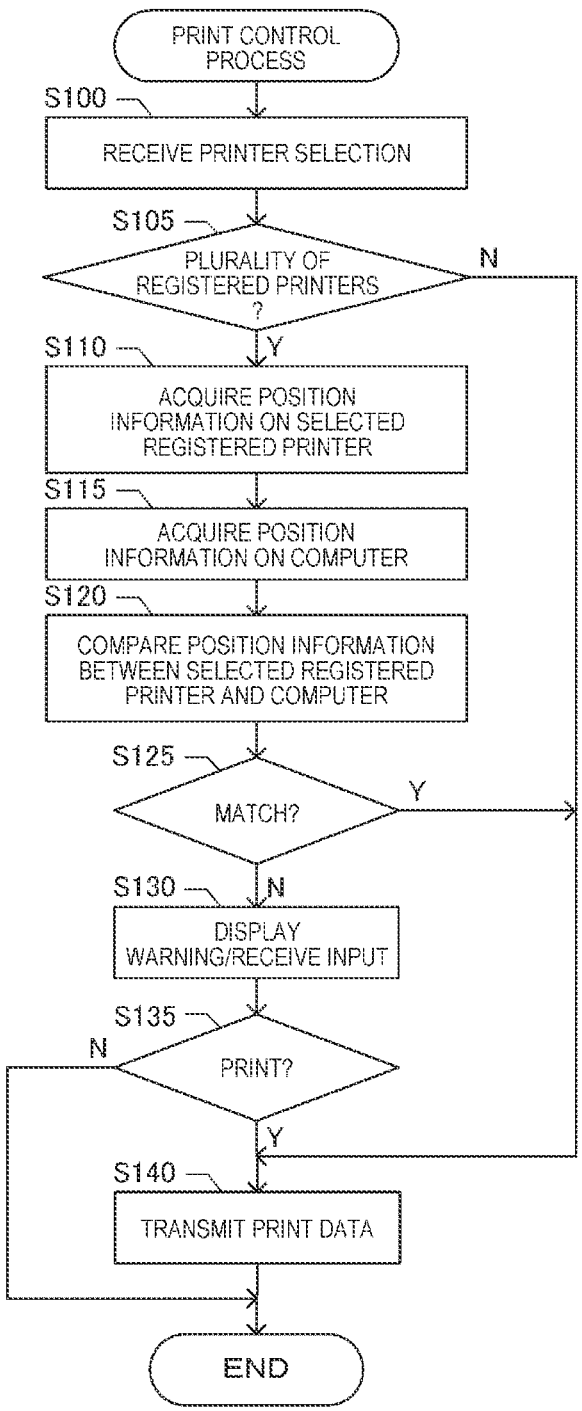

FIG. 7

| NUMBER OF DISTANT PRINTERS | NUMBER OF NEAR PRINTERS | STATE OF PRESENCE OF PRINTER | OPERATION | |
|---|---|---|---|---|
| 1 | 0 | ONLY ONE DISTANT PRINTER | PERFORM IMMEDIATELY | N DETERMINATION IN S105 |
| 0 | 1 | ONLY ONE NEAR PRINTER | PERFORM IMMEDIATELY | |
| ONE OR MORE | ONE OR MORE | CO-EXIST | SELECT DISTANT PRINTER → WARN SELECT NEAR PRINTER → PERFORM IMMEDIATELY | Y DETERMINATION IN S105 |
| 0 | PLURAL | ONLY NEAR PRINTER | PERFORM IMMEDIATELY | |
| PLURAL | 0 | ONLY DISTANT PRINTER | WARN (OR MAY PERFORM IMMEDIATELY) | | ies# PRINT CONTROL APPARATUS, METHOD FOR PRODUCING PRINTED OBJECT, AND PRINT CONTROL PROGRAM The present application is based on, and claims priority from JP Application Serial Number 2023-005106, filed Jan. 17, 2023, the disclosure of which is hereby incorporated by reference herein in its entirety.

BACKGROUND

1. Technical Field

The present disclosure relates to a print control apparatus, a method for producing a printed object, and a print control program.

2. Related Art

In the related art, there is known a technique enabling printing to be performed by any one of printers located in different areas (for example, see JP-A-2015-5177).

When printing can be performed by printers located in different areas, due to an operational error or the like, printing may be performed by a printer located in a distant area even when a user intends to print by a printer located in the same area as an area where the user is located.

SUMMARY

A print control apparatus for solving the above-described problem includes: a selection unit configured to receive selection of one printer from selectable printers; a print control unit configured to transmit print data to the selected printer and cause the selected printer to print; and a warning unit, in which, in a case where a near printer located in the same area as the print control apparatus and a distant printer located in an area different from the print control apparatus co-exist as the selectable printers, when a user selects the distant printer to print, the warning unit warns the user before causing the print control unit to print, and when the user selects the near printer to print, the warning unit causes the print control unit to print without warning the user, and in a case where all of the selectable printers are the near printers and in a case where only one distant printer is selectable as the selectable printer, the warning unit causes the print control unit to print without warning the user.

A method for producing a printed object for solving the above-described problem is a method for producing a printed object to be printed by transmitting print data to a selected printer, the method including: in a case where a near printer located in the same area as an area where a user is located and a distant printer located in an area different from the area where the user is located co-exist as selectable printers, when the user selects the distant printer to print, issuing a warning to the user before printing and producing the printed object by printing in response to a fact that the user desires to print even though the warning is received, and when the user selects the near printer to print, producing the printed object by printing without issuing the warning to the user.

A print control program for solving the above-described problem includes: causing a computer to operate as a print control unit configured to transmit print data to a selected printer and cause the selected printer to print, and a warning unit, in which in a case where a near printer located in the same area as an area where the computer is located and a distant printer located in an area different from the area where the computer is located co-exist as selectable printers, when a user selects the distant printer to print, the warning unit warns the user before causing the print control unit to print, and when the user selects the near printer to print, the warning unit causes the print control unit to print without warning the user.

BRIEF DESCRIPTION OF THE DRAWINGS

FIG. 2 is a block diagram of a printer.
FIG. 3 is a block diagram of a server.
FIG. 4 shows registered printer information.
FIG. 6 is a flowchart of a print control process.
FIG. 7 shows an operation according to the number of distant printers and near printers and a state of presence thereof.

DESCRIPTION OF EMBODIMENTS

Here, an embodiment of the present disclosure will be described according to the following order.
(1) Configuration of Print Control System
(1-1) Configuration of Printer
(1-2) Configuration of Server
(1-3) Configuration of Computer
(2) Print Control Process
(3) Other Embodiments

(1) Configuration of Print Control System

Figure 1:
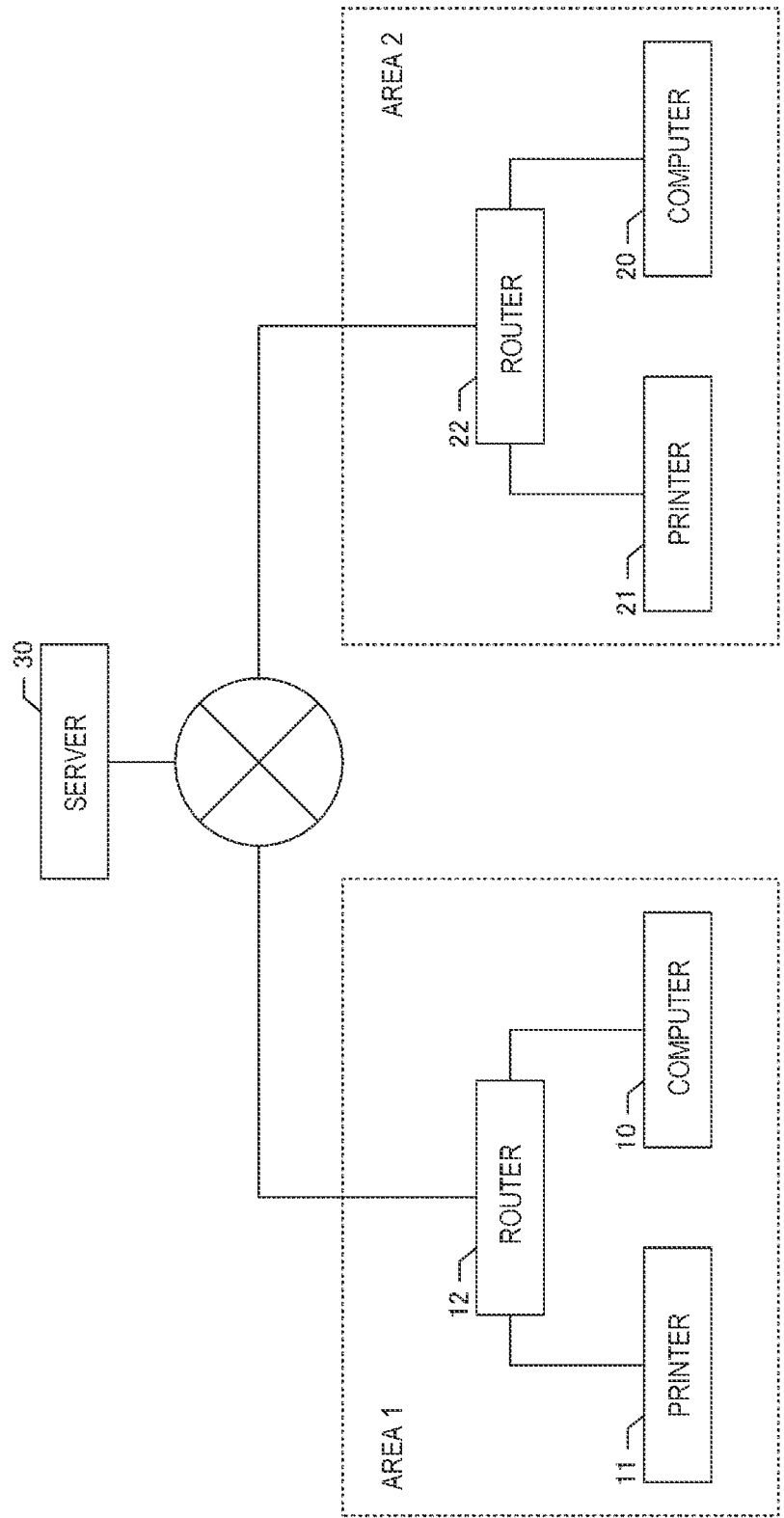
FIG. 1 is a block diagram of a print control system.

FIG. 1 shows an example of a print control system including a print control apparatus according to an embodiment of the present disclosure. The print control system includes electronic devices located in a plurality of areas and a server 30. In the example shown in FIG. 1, an area 1 and an area 2 are areas physically apart from each other. Here, an example is assumed in which the area 1 is a small scale office, and a user works in the area 1. The area 2 is assumed to be an office that is a workplace of the user.

There are a computer 10, a printer 11, and a router 12 in the area 1. The computer 10 and the printer 11 are connected to the router 12 by wired communication or wireless communication. That is, in the area 1, a local area network (LAN) is formed in which the computer 10 and the printer 11 can communicate with each other by the router 12. The router 12 controls communication with an external apparatus via the Internet. The computer 10 and the printer 11 can communicate with the server 30 and an electronic device in the area 2 via the router 12.

In the example shown in FIG. 1, in the area 2, there are electronic devices similar to those in the area 1. That is, in the area 2, there are a computer 20, a printer 21, and a router 22. In the area 2, the computer 20 and the printer 21 can communicate with each other by the router 22, and can communicate with an external apparatus.

In the present embodiment, the user operates the computer 10 to generate print data and issues an instruction to print contents indicated by the print data. At this time, the user can select not only the printer 11 but also the printer 21. In the embodiment, the server 30 operates to enable printing to such a printer located at a remote location. That is, the server 30 can receive a print request from the computer 10 via the Internet and cause the printer 11 or the printer 21 to print.

Thus, the user can print using the printer 21 located at a position away from the computer 10 operated by the user. Accordingly, the user can cause the printer 21 to print a printed object to be used when the user goes to the office that is the workplace at the distant position, a printed object to be used by another person in the office that is the workplace, or the like.

However, most of needs when the user uses the printed object are needs for using the printed object printed by the printer 11 that is near the user. Accordingly, although the print control system according to the embodiment provides convenience of enabling printing by the printer 21 located at the distant position, there is a problem that the printed object may be wasted when the printer 21 is erroneously selected to print. There is also a problem that information printed on the printed object may be disclosed to an unexpected person. Therefore, in the embodiment, a process is performed in order to prevent printing caused by erroneous selection.

Hereinafter, each apparatus constituting the above-described print control system will be described.

(1-1) Configuration of Printer

FIG. 2 is a block diagram showing a configuration of the printer 11. The printer 11 includes a processor 11a, a communication unit 11b, a non-volatile memory 11c, a print unit 11d, a UI unit 11e, and a global navigation satellite system (GNSS) reception unit 11f. The processor 11a includes a CPU, a ROM, a RAM, and the like (not shown), and can execute various programs recorded in the non-volatile memory 11c to control each unit of the printer 11.

The processor 11a may be implemented by a single chip, may be implemented by a plurality of chips, or may be implemented as an SoC with various functional blocks. For example, an ASIC may be adopted instead of the CPU, or the CPU and the ASIC may cooperate with each other. When each apparatus in the present embodiment includes a processor, the processor may be implemented in various manners similarly to the processor 11a.

The communication unit 11b includes a communication interface for communicating with an external device according to various communication protocols. The printer 11 can communicate with the router 12 by the communication unit 11b and communicate with other devices via the router 12. The communication unit 11b may include an interface for communicating with various removable memories mounted on the printer 11.

The print unit 11d is a unit configured to perform printing and prints contents on a print medium. A print method is not limited, and various methods such as an ink jet method, a toner method, and a sublimation method can be adopted. The print medium is not limited to print paper and may be various print media such as cloth, ceramic, and resin. The print unit 11d includes an actuator and various apparatuses for printing on various media, a sensor, a drive circuit, a mechanical component, and the like.

The UI unit 11e includes at least one of a touch panel display, various keys, a switch, an LED, and the like. The touch panel display includes a display panel that displays various types of information such as a status of the printer 11 and a remaining amount of ink, and a touch detection panel superimposed on the display panel. The touch panel display detects a touch operation. The LED performs display in terms of lighting or blinking to indicate the status of the printer 11, or the like. The processor 11a can acquire operation contents of an administrator via the UI unit 11e. The processor 11a can also display various types of information on a display of the UI unit 11e to notify the administrator of the information.

The GNSS reception unit 11f is an apparatus that receives a signal output by a navigation satellite. Based on the signal received by the GNSS reception unit 11f, the processor 11a can identify coordinates (latitude and longitude) where the printer 11 is located.

In the embodiment, the printer 11 can print based on the print data transmitted from the server 30. That is, the processor 11a acquires print data 10c1 from the server 30 via the communication unit 11b and controls the print unit 11d based on the print data 10c1 to perform printing. The above-described configuration is the configuration of the printer 11, and the printer 21 may also have the same configuration as the printer 11.

(1-2) Configuration of Server

FIG. 3 is a block diagram showing a configuration of the server 30. The server 30 includes a processor 30a, a communication unit 30b, and a non-volatile memory 30c. The processor 30a includes a CPU, a ROM, a RAM, and the like (not shown), and can execute various programs recorded in the non-volatile memory 30c to control each unit of the server 30 and each apparatus connected to the network.

The communication unit 30b includes a communication interface for communicating with an external device according to various communication protocols. The server 30 can communicate with another apparatus via the communication unit 30b and a router (not shown). The communication unit 30b may include an interface for communicating with various removable memories mounted on the server 30.

Various types of information are stored in the non-volatile memory 30c of the server 30. For example, registered printer information 30c1 indicating a registered printer, by an instruction from the server 30, as a printer that can print is recorded in the non-volatile memory 30c. FIG. 4 shows an example of the registered printer information 30c1. In the embodiment, the registered printer information 30c1 is formed by associating a printer ID for identifying each registered printer with position information on each registered printer. The printer ID may be any information through which the registered printer can be distinguished, and is a specific name assigned to each registered printer in the embodiment. In FIG. 4, a printer 001 is a name of the printer 11, and a printer 002 is a name of the printer 21.

The printer position information includes GNSS information indicating a position of an area where each registered printer is located and an IP address assigned to the area. In the embodiment, the GNSS information is coordinates (latitude and longitude) where the registered printer is located, and is acquired by a GNSS reception unit provided in each registered printer. The IP address assigned to the area is a global IP address of a router to which the registered printer is connected. For example, in the example shown in FIG. 4, since the printer 11 having the name of the printer 001 is connected to the router 12, a global IP address xxx.xxx.xxx.xxx shown in FIG. 4 is a global IP address assigned to the router 12. Coordinates (X1, Y1) are location coordinates of the printer 11 acquired by the GNSS reception unit of the printer 11.

The registration of the printer into the registered printer information 30c1 is performed in advance before printing by each registered printer. The registration is performed by the user operating the computer 10 or the computer 20. For example, the user operates an input unit 10e of the computer 10 to designate the printer 11 as the registered printer that can print according to the instruction from the server 30. When the designation is performed, the computer 10 transmits the printer ID of the printer 11, the coordinates of the printer 11, and the global IP address of the router 12 to the server 30. The server 30 acquires such information via the communication unit 30b and stores the information in the non-volatile memory 30c as the registered printer information 30c1. Registration of the printer 21 into the registered printer information 30c1 may be performed from a remote location, for example, from the computer 10.

When the print data is transmitted from the outside to the server 30, the print data is stored in a non-volatile memory 10c. For example, when the print data 10c1 is transmitted from the computer 10 to the server 30 in order to print by the printer 11, the print data 10c1 is recorded in the non-volatile memory 30c. Based on the registered printer information 30c1, the processor 30a identifies the global IP address associated with the router 12 in the area where the printer 11 selected as a print execution printer is located. The processor 30a transmits the print data 10c1 to a destination, that is, the printer 11 connected to the router 12 associated with the global IP address. As a result, the printer 11 prints based on the print data 10c1.

(1-3) Configuration of Computer

Figure 5:
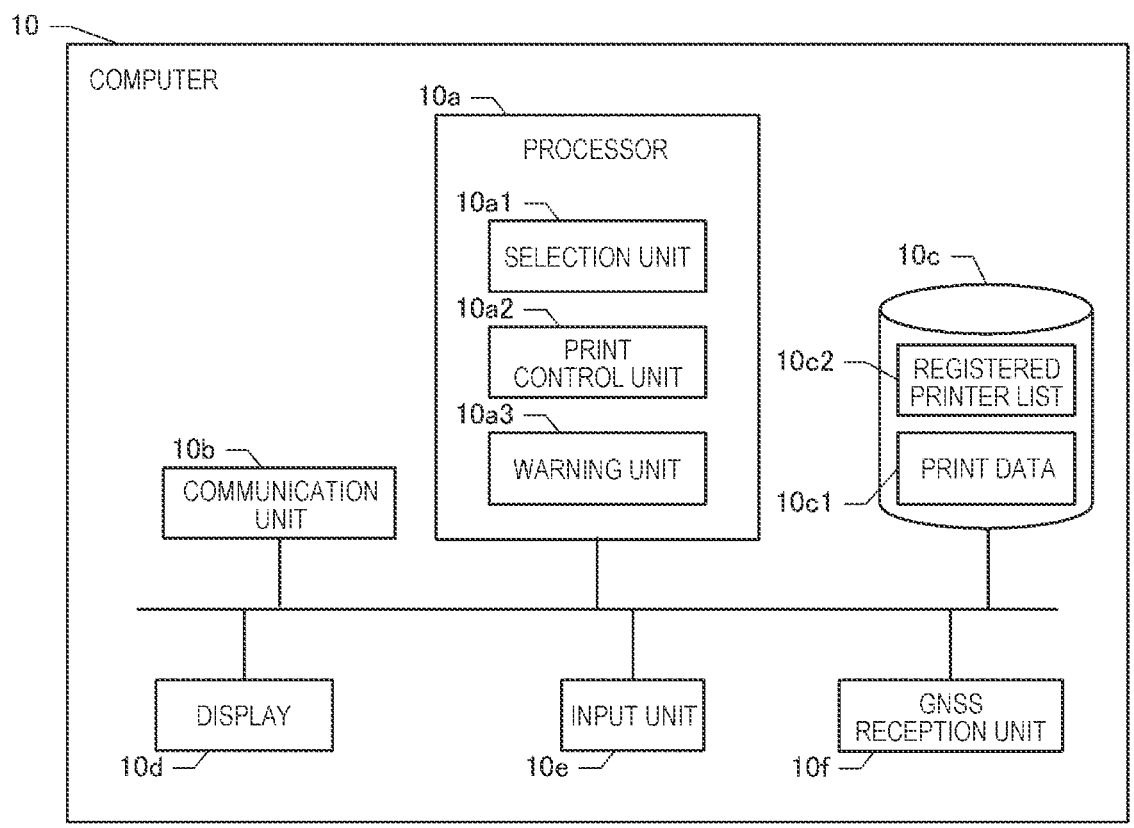
FIG. 5 is a block diagram of a computer serving as a print control terminal.

FIG. 5 is a block diagram showing a configuration of the computer 10. The computer 10 includes a processor 10a, a communication unit 10b, the non-volatile memory 10c, a display 10d, the input unit 10e, and a GNSS reception unit 10f. The processor 10a includes a CPU, a ROM, a RAM, and the like (not shown), and can execute various programs stored in the non-volatile memory 10c to control each unit of the computer 10.

The communication unit 10b includes a communication interface for communicating with an external device according to various communication protocols. The computer 10 can communicate with the router 12 by the communication unit 10b and communicate with another apparatus via the router 12. The communication unit 10b includes an interface for communicating with various removable memories mounted on the computer 10.

The display 10d is a display apparatus that displays any image. The input unit 10e is an apparatus through which a user performs an input operation, and includes, for example, a keyboard and a mouse. In the embodiment, it is assumed that the computer 10 is a stationary terminal, and of course, the computer 10 may be a terminal of another aspect. For example, the computer 10 may be a tablet terminal or a smartphone terminal. When the computer 10 is such a terminal, the input unit 10e may be implemented by a touch panel or the like. In any case, the user can input an intention of the user by operating the input unit 10e while visually recognizing an image or a character displayed on the display 10d.

The GNSS reception unit 10f is an apparatus that receives a signal output by a navigation satellite. Based on the signal received by the GNSS reception unit 10f, the processor 10a can identify coordinates (latitude and longitude) where the computer 10 is located.

The processor 10a executes a print control program (not shown). When the processor 10a executes the print control program, the computer 10 functions as a print control apparatus. When the print control program is executed, the processor 10a functions as a selection unit 10a1, a print control unit 10a2, and a warning unit 10a3. The selection unit 10a1 is a function of receiving selection of one printer from selectable printers. In the embodiment, printers that can print according to the instruction from the server 30 are registered as registered printers in advance, and such information is stored in the non-volatile memory 30c as the registered printer information 30c1.

The user can select a print target printer from the registered printers. Specifically, the computer 10 issues an acquisition request to acquire a list of the registered printers that can print according to the instruction from the server 30. When the acquisition request is issued, the server 30 refers to the registered printer information 30c1, generates a registered printer list 10c2 indicating a list of printer IDs, and transmits the registered printer list 10c2 to the computer 10. The processor 10a acquires the registered printer list 10c2 and stores the registered printer list 10c2 in the non-volatile memory 10c. In the embodiment, position information on each printer is associated with a respective one of printer IDs in the registered printer information 30c1.

As described above, when the user prints any contents in a state in which the registered printer list 10c2 is registered in advance, the processor 10a refers to the registered printer list 10c2 and displays a list of registered printers on the display 10d according to the function of the selection unit 10a1. The user operates the input unit 10e to select one registered printer from the list of registered printers. The processor 10a receives the selected registered printer and identifies the selected registered printer as the print execution printer.

The print control unit 10a2 is a function of transmitting the print data 10c1 to the selected registered printer and printing. Contents indicating a print target may be generated in various forms. For example, the user operates the input unit 10e to operate an application program (not shown) and thus generates the contents indicating the print target. Of course, information indicating the contents indicating the print target may be transferred to the computer 10 by a non-volatile memory or the like.

When the user uses the function of the application program to issue an instruction to print the contents indicating the print target, by the function of the print control unit 10a2, the processor 10a generates the print data 10c1 for printing the contents and stores the print data 10c1 in the non-volatile memory 10c. The process of generating the print data 10c1 may be performed by the printers 11 and 21, or by the server 30 and the computer 20. When the print data 10c1 is generated, the processor 10a transmits the print data 10c1 to the server 30 by the function of the print control unit 10a2. Upon receiving the print data 10c1, the server 30 transmits the print data 10c1 to the registered printer selected as the print execution printer. As a result, the print execution printer prints based on the print data 10c1.

In the above-described configuration, the user can select the printer 11 located in the same area as an area where the user is located or the printer 21 located in a different area. For this reason, the user may erroneously select the printer 21 even though the printer 11 is intended to perform printing. In order to prevent execution of printing due to such erroneous selection, in the embodiment, a warning is output when there is a possibility of erroneous selection.

To issue such a warning, the processor 10a functions as the warning unit 10a3. The warning unit 10a3 is a function of issuing a warning before printing when it is estimated that the possibility of erroneous selection is high based on the printer selected by the user. Specifically, the warning unit 10a3 determines presence or absence of the warning based on whether the selected registered printer is a near printer located in the same area as the self or a distant printer located in a different area. In the embodiment, the "self" refers to the computer 10 which is the print control apparatus. Accordingly, when viewed from the computer 10, the printer 11 is the near printer, and the printer 21 is the distant printer.

In the embodiment, an area where the computer 10 is located is identified by the coordinates where the computer 10 is located and the global IP address of the router to which the computer 10 is connected. For this reason, the processor 10a refers to the registered printer list 10c2 stored in the non-volatile memory 10c and acquires the position information on the registered printer selected as the print execution printer, that is, the coordinates and the global IP address. At this time, by the function of the warning unit 10a3, the processor 10a may acquire the position information on the registered printer selected as the print execution printer newly from the processor 30a of the server 30 via the communication unit 30b.

By the function of the warning unit 10a3, the processor 10a also acquires an output signal of the GNSS reception unit 10f and identifies the coordinates of the computer 10. By the function of the warning unit 10a3, the processor 10a communicates with the router 12 and acquires the global IP address assigned to the router 12.

By the function of the warning unit 10a3, the processor 10a determines that the coordinates of the computer 10 match the coordinates of the registered printer when the coordinates of the registered printer are within a specific distance from the coordinates of the computer 10. By the function of the warning unit 10a3, the processor 10a determines that the global IP address corresponding to the computer 10 matches the global IP address corresponding to the registered printer when the global IP address of the router with which the computer 10 communicates is the same as the global IP address associated with the registered printer selected as the print execution printer.

When the coordinates and the global IP address are both matched, the processor 10a determines that the area registered in association with the registered printer selected as the print execution printer is the same area as the computer 10, and the registered printer is the near printer. When at least one of the coordinates and the global IP address is not matched, the processor 10a determines that the area registered in association with the registered printer selected as the print execution printer is an area different from the computer 10, and the registered printer is the distant printer.

When the near printer and the distant printer co-exist, the processor 10a determines the presence or absence of the warning according to the selected registered printer. That is, if the user selects the distant printer to print, the processor 10a warns the user before causing the print control unit 10a2 to print. On the other hand, if the user selects the near printer to print, the processor 10a causes the print control unit 10a2 to print without warning the user. When the printing is performed, it can be said that a printed object is produced.

The warned user can determine whether the registered printer selected as the print execution printer is as intended. Since most printing needs are printing by the near printer, in the case where the near printer and the distant printer co-exist, when the distant printer is selected, a warning is issued before printing, and thus it is possible to prevent occurrence of wasteful printing due to most of erroneous selection. In addition, it is possible to prevent information printed on a printed object from being disclosed to an unexpected person.

When all the selectable registered printers are near printers and when only one distant printer is selectable as the selectable printer, the processor 10a causes the print control unit 10a2 to print without warning the user. In such cases, since the distant printer is not selected while the near printer is intended or the near printer is not selected while the distant printer is intended, no warning is issued. As described above, according to the embodiment, it is possible to reduce the possibility of printing by the distant printer while the near printer is intended. Since no warning is issued when the possibility of erroneous selection is low, it is possible to simplify confirmation leading up to start of printing, and thus the user does not feel bothersome. The above-described configuration is the configuration of the computer 10, and the computer 20 may also have the same configuration as the computer 10.

(2) Print Control Process

FIG. 6 is a flowchart of a print control process. When the user performs printing related to any contents, the user operates the input unit 10e of the computer 10 to perform input for starting a print process. The input may be performed by various methods, and for example, an instruction to start the print process under execution of an application program corresponds to the input.

When the input is performed, the processor 10a starts the print control process. When the print control process starts, by the function of the selection unit 10a1, the processor 10a receives the selection of the registered printer (step S100). Specifically, the processor 10a refers to the registered printer list 10c2 and acquires the name of the registered printer. As a result, a printer selectable as the registered printer to perform printing is specified. The processor 10a also controls the display 10d to display the name of the registered printer as a choice and receives the registered printer selected by the user by operating the input unit 10e.

Next, the processor 10a determines whether there are a plurality of selectable registered printers (step S105). That is, the processor 10a refers to the registered printer list 10c2 and determines whether there are a plurality of registered printers. In step S105, when it is not determined that there are a plurality of registered printers, the processor 10a transmits the print data 10c1 to the selected registered printer by the function of the print control unit 10a2 (step S140).

When there are not a plurality of selectable registered printers, the registered printer is one near printer or one distant printer. Accordingly, in this case, there is only one choice, and thus the user is less likely to select an unintended printer. Therefore, in the embodiment, it is considered that the possibility of erroneous selection is low, and printing is performed without warning. Specifically, the processor 10a regards the selected registered printer as the print execution printer. Based on contents of a print target, the processor 10a generates the print data 10c1 and transmits the print data 10c1 to the server 30 together with information indicating the print execution printer. When the server 30 receives the print data 10c1, the server 30 identifies the print execution printer, refers to the registered printer information 30c1, identifies the global IP address of the print execution printer, specifies the global IP address and the print execution printer as a destination, and transmits the print data 10c1. As a result, printing is performed by the printer selected in step S100.

In FIG. 7, an operation according to the number of the distant printer and the near printer and a state of presence thereof in the embodiment is shown. In step S105, when it is not determined that there are a plurality of selectable registered printers, the state is as shown in a first line or a second line in a table shown in FIG. 7. In this case, since printing is performed without warning, it is indicated that printing is performed immediately as an operation. In the embodiment, since the computer 10 is configured to print using the server 30, a state is not assumed in which there is no registered printer. However, if there is no registered printer and for example, the computer 10 can cause the printer 11 to print via the router 12, printing may be performed without using the server 30.

On the other hand, when it is determined in step S105 that there are a plurality of selectable registered printers, that is, when the state is as shown in any one of third to fifth lines in the table shown in FIG. 7, the processor 10a performs the step S110 and subsequent processes. In step S110, the processor 10a acquires the position information on the selected registered printer by the function of the warning unit 10a3. That is, by the function of the warning unit 10a3, the processor 10a transmits, to the server 30 via the communication unit 10b, a transmission request for transmitting the position information on the registered printer selected in step S100. In response to the transmission request, the processor 30a of the server 30 refers to the registered printer information 30c1, acquires the position information on the requested registered printer, and returns the position information to the computer 10. As a result, the processor 10a acquires the coordinates and the global IP address of the registered printer selected in step S100.

Next, the processor 10a acquires the position information on the computer by the function of the warning unit 10a3 (step S115). Specifically, the processor 10a acquires the output signal of the GNSS reception unit 10f and identifies the coordinates of the computer 10. The processor 10a communicates with the router 12 via the communication unit 10b to acquire the global IP address assigned to the router 12.

Next, the processor 10a compares the position information between the selected registered printer and the computer by the function of the warning unit 10a3 (step S120). Specifically, by the function of the warning unit 10a3, the processor 10a determines whether the coordinates of the registered printer acquired in step S110 are within a specific distance from the coordinates of the computer 10 acquired in step S115. When the coordinates of the registered printer are within this range, it is determined that the coordinates of the computer 10 match the coordinates of the registered printer.

By the function of the warning unit 10a3, the processor 10a determines whether the global IP address acquired in step S115 is the same as the global IP address acquired in step S110.

When the coordinates and the global IP address are both matched, the registered printer is the near printer located in the area close to the computer 10. When the coordinates and the global IP address are not both matched, the registered printer is the distant printer located in the area far from the computer 10.

When the coordinates and the global IP address are both matched, that is, when the selected registered printer is the near printer, the processor 10a skips step S130 and step S135 and performs step S140 after a determination in step S125. That is, the processor 10a transmits the print data 10c1 to the server 30 without issuing the warning on erroneous printer selection, and performs printing using the registered printer selected in step S100 as the print execution printer.

The case where the coordinates and the global IP address are both matched corresponds to a part in the third line or the fourth line in FIG. 7. That is, when step S110 and subsequent processes are performed, since there are a plurality of registered printers, the state is any one of the state in the third line in which the distant printer and the near printer are both one or more, the state in the fourth line in which there is no distant printer and there are a plurality of near printers, and a state in the fifth line in which there are a plurality of distant printers and there is no near printer.

When it is determined in step S125 that the coordinates and the global IP address are both matched, the registered printer is the near printer. Accordingly, such a state is one of a state in which the near printer is selected in a state in which the distant printer and the near printer co-exist as in the third row in FIG. 7, or a state in which there is only the near printer as in the fourth line in FIG. 7. In such a state, step S130 and step S135 are skipped, step S140 is performed, and thus printing is immediately performed without warning. That is, since the state is a state in which erroneous selection, such as selecting the distant printer while attempting to print by the near printer, does not occur, no warning is issued.

Figure 8:
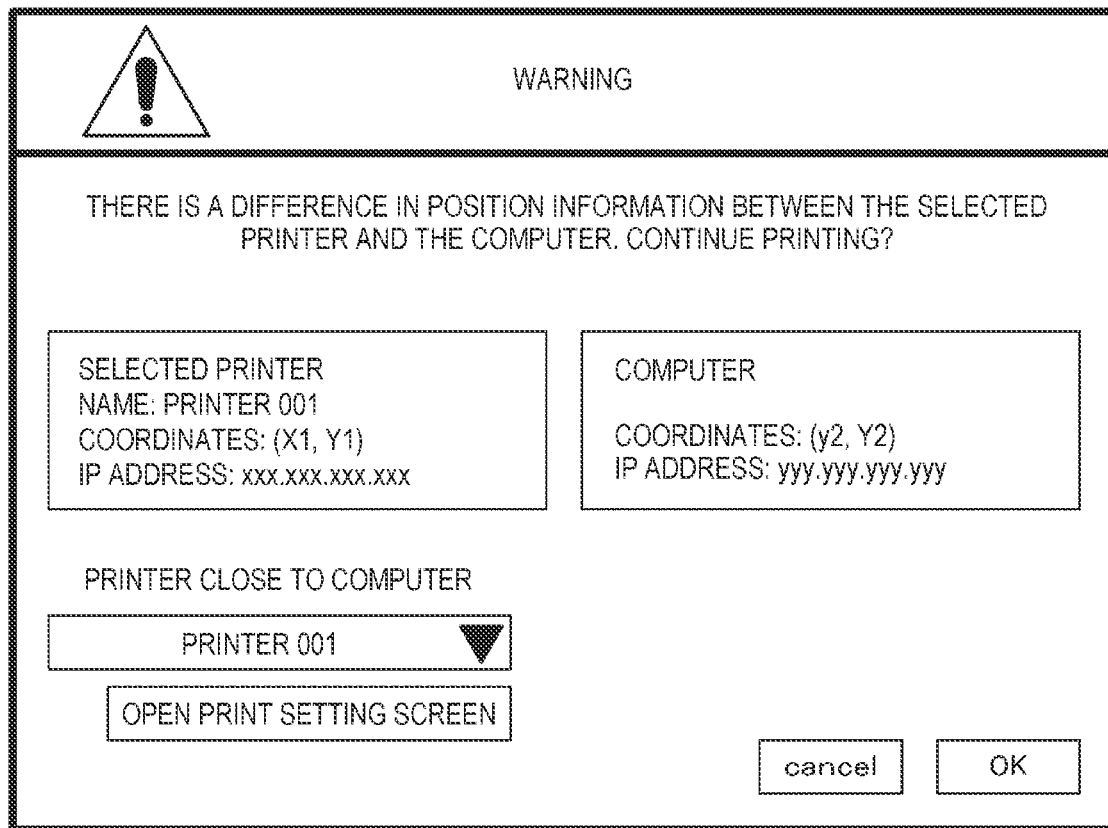
FIG. 8 shows an example of a warning screen.

When at least one of the coordinates and the global IP address is not matched, that is, when the selected registered printer is the distant printer, the processor 10a displays the warning and receives input from the user by the function of the warning unit 10a3 after the determination in step S125 (step S130). Specifically, the processor 10a controls the display 10d to display a warning screen. FIG. 8 shows an example of the warning screen.

In the example shown in FIG. 8, an icon indicating a warning and characters "warning" are displayed in an upper portion, and warning contents are displayed below. The warning contents include characters indicating that the position information on the selected printer is different from that on the computer, and characters inquiring whether to continue printing. A box indicating the name, the coordinates, and the global IP address of the selected printer, and a box indicating the coordinates and the global IP address of the computer are also provided.

In the embodiment, introduction of a selectable near printer is also provided on the warning screen. In FIG. 8, characters "printer near computer" are shown, and a box displaying a choice of the printer is shown below. When the user operates the input unit 10e to specify the box, the processor 10a acquires a list of near printers. Specifically, the processor 10a acquires the coordinates of the computer 10 and the global IP address of the router 12 to which the computer 10 is connected, and transmits such information to the server 30 via the communication unit 10b.

The server 30 refers to the registered printer information 30c1 and acquires a registered printer to which coordinates within the specific range from the coordinates of the computer 10 are associated and whose global IP address matches that of the computer 10. That is, the server 30 acquires the printer ID of the near printer close to the computer 10. Then, the server 30 transmits the printer ID of the near printer to the computer 10 via the communication unit 30b.

The computer 10 controls the display 10d to display the printer ID of the near printer. The user can change the print execution printer while performing various print settings by operating the input unit 10e, selecting a desired near printer, and issuing an instruction by an "open print setting screen" button. In this case, when the user performs the print setting, the processor 10a starts executing the process again from step S100. According to the above-described configuration, when the user is to print by a printer different from the intended printer, the user can print by the printer close to the user by selecting the introduced near printer. When there is no near printer, the introduction on the near printer is not performed.

On the screen shown in FIG. 8, an "OK" button and a "cancel" button are also displayed. When the user operates the input unit 10e and issues an instruction using the "cancel" button, the processor 10a determines in step S135 that there is no print execution instruction, and ends the print control process. With this configuration, the user can prevent the execution of the print control process when printing is to be performed by a printer different from the intended printer.

When the user operates the input unit 10e and operates the "OK" button on the screen shown in FIG. 8, the processor 10a determines in step S135 that there is a print execution instruction, and executes step S140. That is, the processor 10a assumes that there is an instruction to execute printing without changing the printer selected in step S100, and executes printing in step S140 without changing the print execution printer.

The case where at least one of the coordinates and the global IP address acquired in step S110 and step S115 is not matched corresponds to a part in the third line or the fifth line in FIG. 7. That is, when it is determined in step S125 that at least one of the coordinates and the global IP address is not matched, the registered printer is the distant printer. Accordingly, such a state is one of a state in which the distant printer is selected when the distant printer and the near printer co-exist as in the third line in FIG. 7, or a state in which there is only the distant printer as in the fifth line in FIG. 7.

As shown in the third line in FIG. 7, in the state in which the distant printer is selected when the distant printer and the near printer co-exist, the user may erroneously select the distant printer even though the user intends to print by the near printer. Therefore, in the embodiment, printing is not immediately performed, the warning is issued, and thus the user is provided an opportunity to perform correction when erroneous selection occurs. As a result, it is possible to reduce a possibility that printing is performed with erroneous selection. On the other hand, in the embodiment, the warning is issued even in the state in which there is only the distant printer as in the fifth line in FIG. 7, but printing may also be performed immediately without warning since it is estimated that the possibility of erroneous selection is low in this state.

(3) Other Embodiments

The above-described embodiment is an example for implementing the disclosure, and various other embodiments may be adopted. For example, the apparatus configuration of the print control system is not limited to the configuration shown in FIG. 1. For example, the computer 20 may not be located in the area 2, or there may be two or more printers in each of the areas 1 and 2. In addition, there may be three or more areas. The terminals shown in FIG. 1 may be a smaller number of terminals sharing functions or may be a larger number of terminals. For example, the computer 10 and the printer 11 may be an integrated apparatus, and the server 30 may be the same terminal as at least one of the computers 10 and 20 located in each area. Further, each terminal may be constituted by a larger number of terminals such as the server 30 being a cloud server.

A mode as in the above-described embodiment in which the warning can be issued according to the printer selected by the user, and a mode in which no warning is issued may be selected in advance by the user.

The position information may be various types of information as long as the position information is information indicating a position, and the information may be acquired by various methods such as acquiring from an external apparatus or manually inputting by the user. For example, the information is not limited to the GNSS information indicating the position of the area and the IP address assigned to the area, and may be an address of the area, a service set identifier (SSID) of the router located in the area, or any combination thereof. The address of the area may be information indicating a place identified by a name, a numerical value, a symbol, or the like of an administrative district. For example, the address may be specified by the user inputting the address, and the address including the coordinates specified by the GNSS information or the like may be identified by an address management server or by various methods. When the router 12 is a wirelessly communicable router, an SSID is assigned to the router 12. For this reason, apparatuses that perform wireless communication using a common SSID can be regarded as being located in the same area. Various other types of information may be used as the position information. For example, a position of a terminal (the printer or the computer) may be identified using a communication state between a wireless LAN base station or a mobile phone network base station and the terminal.

The coordinates of the above-described printers 11 and 21 are identified using the GNSS reception unit, and an area where a printer including no GNSS reception unit is located may be identified based on coordinates of another apparatus or the like. For example, if the computer 10 located near the printer 11 includes a GNSS reception unit, the coordinates of the computer 10 acquired by the GNSS reception unit may be registered in the registered printer information 30c1 as coordinates for identifying the area of the printer 11.

The selection unit may be able to receive selection of one printer from selectable printers. That is, the selection unit may be able to select the printer to perform printing. The selectable printers may be registered in the server 30 in advance as in the above-described embodiment or may be registered in the computers 10 and 20.

The print control unit may be able to transmit the print data to the selected printer and cause the printer to print. That is, the print control unit may be able to cause the selected near printer or distant printer to print. In the above-described embodiment, the print data is transmitted to the server even when the near printer is selected, and the print data is transmitted from the server to the near printer to perform printing. Alternatively, the print data may also be transmitted from the computer to the near printer.

The determination of whether the printer is the near printer located in the same area as the computer 10 or the distant printer located in the different area is not limited to that described above. This determination is substantially the same as a determination of whether a positional relationship between the printer and the computer satisfies a predetermined condition. That is, in the process of determining the presence or absence of the warning by the warning unit, it may be determined that the selected printer is the near printer when the selected printer is located near the computer used by the user and that the selected printer is the distant printer when the selected printer is far from the computer used by the user, or it may be determined whether the positional relationship between the printer and the computer matches as in the above-described embodiment.

The area is a concept for comparing whether the printer is close when viewed from the user or the computer used by the user, and may be a point or a region having a finite area. A value indicating a size of the area, for example, a distance from coordinates where a device is located may be set in advance and may have various values such as 1 km and 100 m. If the printer is located in the same room, the printer may be the near printer, and if the printer is not located in the same room, the printer may be the distant printer. In addition, the concept is not limited to a concept in which belonging or not belonging to the area can be defined based on a physical distance relationship, such as a point or a region, and may be a concept in which belonging or not belonging to the area can be defined without depending on the physical distance relationship. For example, a configuration in which a plurality of devices connected to a router to which a specific global IP address is assigned belong to the same area corresponds to the latter concept. If the computer can receive a wireless signal generated by the printer, the printer may be determined to be the near printer, and if the computer cannot receive the wireless signal, the printer may be determined to be the distant printer.

When it is estimated that the possibility of erroneous selection is high based on the printer selected by the user, the warning unit may be able to issue the warning before printing. When it is estimated that the possibility of erroneous selection is low, the warning unit may be able to print without warning. Presence or absence of the possibility of erroneous selection may be identified based on the printer selected by the user. That is, when the distant printer is selected while the near printer and the distant printer co-exist, it is estimated that the possibility of erroneous selection is high. In the case where the near printer and the distant printer co-exist, when the near printer is selected, it is estimated that the possibility of erroneous selection is low since printing is performed by the near printer in most cases.

When the printers do not co-exist, it is a state in which only the near printer is selectable or only the distant printer is selectable. When only the near printer is selectable, it is estimated that the possibility of erroneous selection is low, and thus no warning is issued. When only one distant printer is selectable, it is estimated that the possibility of erroneous selection is low, and thus no warning is issued. When a plurality of distant printers are selectable, the warning is issued in the above-described embodiment. Alternatively, it may also be estimated that the possibility of erroneous selection is low and no warning may be issued.

The present disclosure is also applicable to a program and a method executed by a computer. The system, the program, and the method as described above may be implemented as a single apparatus, may be implemented using components provided in a plurality of apparatuses, and each element may be provided in an apparatus different from the above-described apparatus, and various aspects may be included. Changes can be made as appropriate, such as a part being software and a part being hardware. Further, the present disclosure may be implemented as a recording medium of a program for controlling a system. Of course, the recording medium of the program may be a magnetic recording medium or a semi-conductor memory, and the same is true for any recording medium to be developed in the future. In addition, which apparatus performs which process can be appropriately changed. For example, the server 30 may determine whether the printer is the near printer or the distant printer, the server 30 may instruct the computer 10 to issue the warning when the warning is to be issued, and the computer 10 may issue the warning according to the instruction.

What is claimed is:

1. A print control apparatus comprising:
   a processor including
     a selection unit configured to receive selection of one printer from selectable printers;
     a print control unit configured to transmit print data to the selected printer and cause the selected printer to print; and
     a warning unit, wherein
   in a case where a near printer located in the same area as the print control apparatus and a distant printer located in an area different from the print control apparatus co-exist as the selectable printers,
     when a user selects the distant printer to print, the warning unit issues, to the user, warning on erroneous printer selection which includes warning contents indicating difference in position information between the selected distant printer and the print control apparatus, the warning unit issues the warning before causing the print control unit to print,
     when the user selects the near printer to print, the warning unit causes the print control unit to print without issuing the warning to the user, and
   in a case where all of the selectable printers are the near printers and in a case where only one distant printer is selectable as the selectable printer, the warning unit causes the print control unit to print without issuing the warning to the user.

2. The print control apparatus according to claim 1, wherein
   the selection unit receives selection of the one printer from registered printers registered in advance in association with information indicating the area, and
   the warning unit determines that the printer is the near printer when the area registered in association with the selected printer is the same as the print control apparatus, and determines that the printer is the distant printer when the registered area is different from the print control apparatus.

3. The print control apparatus according to claim 2, wherein
   the warning unit determines whether the printer is the near printer or the distant printer using at least one of GNSS information indicating a position of the area, an address of the area, an SSID of a router located in the area, and an IP address assigned to the area.

4. The print control apparatus according to claim 1, wherein
   the warning unit issues, to the user, the warning which includes the warning contents further indicating introduction on the near printer that is selectable and is different from the selected distant printer.

5. A method for producing a printed object to be printed by transmitting print data to a selected printer, the method comprising:
   in a case where a near printer located in the same area as an area where a user is located and a distant printer located in an area different from the area where the user is located co-exist as selectable printers,
     when the user selects the distant printer to print,
       issuing, to the user, warning on erroneous printer selection which includes warning contents indicating difference in position information between the selected distant printer and the area where the user is located, before printing, and
       producing the printed object by printing in response to a fact that the user desires to print even though the warning is received, and when the user selects the near printer to print, producing the printed object by printing without issuing the warning to the user.

6. A non-transitory computer-readable storage medium storing a print control program, the program comprising:
causing a computer to operate as
a print control unit configured to transmit print data to a selected printer and cause the selected printer to print, and
a warning unit, wherein
in a case where a near printer located in the same area as an area where the computer is located and a distant printer located in an area different from the area where the computer is located co-exist as selectable printers,
when a user selects the distant printer to print, the warning unit issues, to the user, warning on erroneous printer selection which includes warning contents indicating difference in position information between the selected distant printer and the area where the computer is located, the warning unit issues the warning before causing the print control unit to print, and
when the user selects the near printer to print, the warning unit causes the print control unit to print without issuing the warning to the user.

7. The print control apparatus according to claim 1, wherein
the warning unit issues, to the user, the warning which includes the warning contents further indicating inquiry regarding whether to cause the print control unit to print at the selected distant printer.

\* \* \* \* \*